US007058602B1

(12) United States Patent
La Mura et al.

(10) Patent No.: US 7,058,602 B1
(45) Date of Patent: Jun. 6, 2006

(54) ENHANCED AUCTION MECHANISM FOR ONLINE TRANSACTIONS

(75) Inventors: Pierfrancesco La Mura, Palo Alto, CA (US); Moshe Tennenholtz, Palo Alto, CA (US); Yoav Shoham, Palo Alto, CA (US)

(73) Assignee: Luckysurf.com, Inc., South San Francisco, CA (US)

( * ) Notice: Subject to any disclaimer, the term of this patent is extended or adjusted under 35 U.S.C. 154(b) by 695 days.

(21) Appl. No.: 09/642,078

(22) Filed: Aug. 18, 2000

(51) Int. Cl.
*G06Q 30/00* (2006.01)
*G06Q 40/00* (2006.01)
(52) U.S. Cl. ...................................................... 705/37
(58) Field of Classification Search ................... 705/37
See application file for complete search history.

(56) References Cited

U.S. PATENT DOCUMENTS

| | | | | |
|---|---|---|---|---|
| 4,745,468 A | | 5/1988 | Von Kohorn | 110/257 |
| 5,018,736 A | * | 5/1991 | Pearson et al. | 463/29 |
| 5,057,915 A | | 10/1991 | Von Kohorn | 463/9 |
| 5,213,337 A | | 5/1993 | Sherman | 463/40 |
| 5,508,731 A | | 4/1996 | Kohorn | 725/24 |
| 5,794,207 A | | 8/1998 | Walker et al. | 705/1 |
| 5,794,219 A | | 8/1998 | Brown | 705/37 |
| 5,823,879 A | | 10/1998 | Goldberg et al. | 463/42 |
| 5,835,896 A | | 11/1998 | Fisher et al. | 705/37 |
| 5,845,265 A | * | 12/1998 | Woolston | 705/37 |
| 5,890,138 A | * | 3/1999 | Godin et al. | 705/26 |
| 5,905,975 A | | 5/1999 | Ausubel | 705/37 |
| 5,916,024 A | | 6/1999 | Von Kohorn | 463/40 |
| 5,964,660 A | | 10/1999 | James et al. | 463/1 |
| 5,970,469 A | | 10/1999 | Scroggie et al. | 705/14 |
| 6,012,045 A | | 1/2000 | Barzilai et al. | 705/37 |
| 6,026,383 A | * | 2/2000 | Ausubel | 705/37 |
| 6,044,363 A | | 3/2000 | Mori et al. | 705/37 |
| 6,061,660 A | | 5/2000 | Eggleston et al. | 705/14 |
| 6,070,874 A | | 6/2000 | Ivers | 273/292 |
| 6,093,100 A | | 7/2000 | Singer et al. | 463/13 |
| 6,119,100 A | * | 9/2000 | Walker et al. | 705/20 |
| 6,146,272 A | | 11/2000 | Walker et al. | 463/17 |
| 6,151,589 A | * | 11/2000 | Aggarwal et al. | 705/37 |
| 6,161,099 A | | 12/2000 | Harrington et al. | 705/37 |
| 6,200,216 B1 | | 3/2001 | Peppel | 463/1 |
| 6,224,486 B1 | | 5/2001 | Walker et al. | 463/42 |
| 6,243,691 B1 | * | 6/2001 | Fisher et al. | 705/37 |
| 6,267,379 B1 | | 7/2001 | Forrest et al. | 273/431 |

(Continued)

FOREIGN PATENT DOCUMENTS

JP     2000-200311 A   *   7/2000

(Continued)

OTHER PUBLICATIONS

Vanderpooten, B., "Strategic Behavior in Pooled Condominium Auctions," (Abstract only), Journal of Urban Economics, vol. 31 No. 1, p. 123, Jan. 1992.*

(Continued)

*Primary Examiner*—Nicholas D. Rosen
(74) *Attorney, Agent, or Firm*—Fenwick & West LLP

(57) ABSTRACT

An auction system and method for suitable use with online transactions which provide a plurality of enhanced auctions is disclosed. The present invention extends, augments or otherwise enhances various auction elements including, for example, the selection of participants, the grouping of participants, the moves made by participants, the bidding process of participants, the information revelation process, the auction closing process, and the auction clearing process, among others. In addition, enhanced auction modules may be used separately or together during the auction process.

3 Claims, 6 Drawing Sheets

U.S. PATENT DOCUMENTS

| | | | |
|---|---|---|---|
| 6,269,343 B1 * | 7/2001 | Pallakoff | 705/26 |
| 6,285,989 B1 | 9/2001 | Shoham | 705/37 |
| 6,366,891 B1 * | 4/2002 | Feinberg | 705/37 |
| 6,394,899 B1 | 5/2002 | Walker | 463/9 |
| 6,415,270 B1 * | 7/2002 | Rackson et al. | 705/37 |
| 6,449,601 B1 | 9/2002 | Friedland et al. | 705/37 |
| 6,450,407 B1 | 9/2002 | Freeman et al. | 235/492 |
| 6,468,159 B1 | 10/2002 | La Mura et al. | 463/42 |
| 6,564,192 B1 * | 5/2003 | Kinney, Jr. et al. | 705/37 |
| 6,565,442 B1 | 5/2003 | La Mura et al. | 463/42 |
| 6,606,608 B1 * | 8/2003 | Bezos et al. | 705/37 |
| 6,676,521 B1 | 1/2004 | La Mura et al. | 463/42 |
| 2001/0032168 A1 * | 10/2001 | Adamson et al. | 705/37 |
| 2001/0032175 A1 * | 10/2001 | Holden et al. | 705/37 |
| 2001/0044769 A1 * | 11/2001 | Chaves | 705/37 |
| 2002/0004787 A1 * | 1/2002 | Moshal et al. | 705/80 |
| 2002/0147674 A1 * | 10/2002 | Gillman | 705/37 |
| 2003/0126069 A1 * | 7/2003 | Cha | 705/37 |
| 2004/0024483 A1 * | 2/2004 | Holcombe | 700/122 |
| 2004/0210512 A1 * | 10/2004 | Fraser et al. | 705/37 |
| 2005/0234811 A1 * | 10/2005 | Herman et al. | 705/37 |

FOREIGN PATENT DOCUMENTS

| | | |
|---|---|---|
| JP | 20000200311 A | 7/2000 |
| WO | WO 00/37154 | 6/2000 |

OTHER PUBLICATIONS

Anon., "Mew Jersey and Maryland Hotel Properties Included in Sealed Bid Sale on Apr. 16," PRNewswire, Feb. 18, 1993.*

Anon., "Firm Being Investigated for Misrepresentation," St. Petersburg Times, Sunday, Sep. 4, 1994, City edition, Tampa Bay and State section, p. 2B.*

DeMaeyer, B., "PCS Auctions: Ready or Not, Here They Come," America's Network, p. 34, Nov. 1, 1994.*

Anon., "Lufthansa Fying High with Korea; German Airlines Began Working Here 30 Years Ago," Korea Herald, Sep. 14, 1998.*

Anon., "From PR Newswire 800-682-9599/ To Business and Retailing Editors," PR Newswire, p. 8694, Mar. 4, 1999.*

Anon., "Yahoo! Introduces Auctions Express Program; New Automated Service Helps Heavy Volume Sellers Sell More on the Web," Business Wire, Jun. 21, 1999.*

Swann, C.E., "Paper Trading on the Web: A Net Gain?," PIMA's North American Papermaker, vol. 81, No. 12, p. 44, Dec. 1999.*

Teather, D., "Branson Hopes to Buy One2One out of Mobile Phone Venture," Guardian, Jan. 12, 2000.*

Vanderporten, Bruce, "Strategic Behavior in Pooled Condominium Auctions," Jan. 1992, Journal of Urban Economics, vol. 31, No. 1, p. 123. (Abstract).

"New Jersey and Maryland Hotel Property included in Sealed Bid Sale on Apr. 16," Feb. 18, 1993, PR Newswire Assciation, Inc.

"Firm Being Investigated for Misrepresentation," Sep. 4, 1994, St. Petersburg Times by Assocuated Press.

"PCS Auctions: Ready or Not, Here They Come," Nov. 1, 1994, America's Network, p. 34. by Bruce DeMaeger.

"Lufthansa Flying High with Korea; German Airlines Began Working Here 30 Years Ago," Sep. 14, 1998, Korea Herald.

"From PR Newswire 800-682-9599/To Business and Retailing Editors," Mar. 4, 19999, PR Newswire, p. 8694.

"Yahoo! Introduces Auctions Express Program; New Automated Services Help Heavy Volume Sellers Sell More on the Web," Jun. 21, 1999, Business Wire.

Teather, David, "Branson Hopes to Buy One2One Out of Mobile Phone Venture," Jan. 12, 2000, The Guardian. Source World Reporter.

* cited by examiner

ENHANCED AUCTION MECHANISM FOR ONLINE TRANSACTIONS

BACKGROUND OF THE INVENTION

1. Field of the Invention

The use of the global information network known as the Internet as a medium for carrying out sales transactions (i.e., online transactions) is known. The popularity of the Internet with home and business computer users has provided a market opportunity to provide transaction mechanisms for such Internet users. Retailers, for example, have launched "online catalogs" via Web pages as an alternative (or additional) means for selling their products or services to their customers.

Recently, online auctions have also gained popularity with Internet users. For example, web sites such as Ebay® and Ubid® provide conventional auction mechanisms, which allow sellers and buyers to engage in auction transactions. Current auctions are defined by a set of participants (sellers and buyers), a set of legal moves (namely, bidding moves and message exchanging moves) for the participants, one or more rounds of moves, each round followed by revelation of information (e.g., current highest bid, current bidders, highest bidder), and a stopping rule, which terminates any further bidding moves and clears the auction.

As noted above, the only legal moves provided by current auction schemes to participants include bidding moves (bids) and message exchanging moves. A bid submitted by a bidder for an item commits the bidder to pay some monetary amount if a given outcome occurs, the outcome resulting when the bidder is the highest bidder with a bid amount satisfying the seller's reserve (minimum) bid amount. Other than bids, the only other legal moves provided to participants in current auction schemes are message exchanging moves (i.e., "cheap talk"), which are payoff-irrelevant exchanges of messages among participants. For example, a bidder may send an email to the seller inquiring into the description (requesting a picture, for example) of the item for sale by the seller.

In general, bids affect the information revelation and the relevant outcome. On the other hand, message exchanges only affect information revelation. The current auction schemes, however, provide the participants with relatively few options and provide an uninteresting transaction scheme.

Accordingly, there is a need for an enhanced system and method for carrying out online transactions and auctions using a plurality of enhanced auction mechanisms which make available a plurality of auctions moves and auction schemes, usable together or separately, to thereby enhance and augment the online auction process. The present invention satisfies these needs, as well as others, and generally overcomes the deficiencies found in the background art.

BRIEF DESCRIPTION OF THE INVENTION

The present invention is an auction system and method for online transactions using an enhanced auction mechanism module. The online auction system comprises an interface module operatively coupled for communication with a transaction module. A mechanism module is further coupled for communication with the transaction module.

In general, the auction system is embodied in software which operates and executes within an auction server, or other conventional data processing means. The auction server is operatively coupled for communication with at least one client node via a conventional network connection, such as the Internet. Participants (sellers and buyers) of the system communicate with the auction system via one or more of the client nodes using a conventional client application providing a user-interface, such as a web browsing application.

The interface module provides an interface between participants of the online transaction systems. In particular, the interface module manages communication requests from the participants (sellers and bidders) of the system as described more fully below. Communications for auction transactions received by the interface module are communicated by the interface module to the transaction module for further processing.

The transaction module manages transactions associated with moves made by the participants of the system, such as when a seller lists an item for sale, or when a bidder places a bid on an item or carries out some other auction related transaction.

The mechanism module defines a plurality of auction rules which dictate the operation of transactions as carried out by the transaction module. The present invention provides a mechanism module with one or more enhanced auction modules. As described more fully below, the enhanced auction modules extend, augment or otherwise enhance various auction elements including, for example, the selection of participants, the grouping of participants, the moves made by participants, the bidding process of the participants, the information revelation process, the auction closing process, and the auction clearing process, among others. In addition, the enhanced auction modules may be used separately or together during the auction process.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
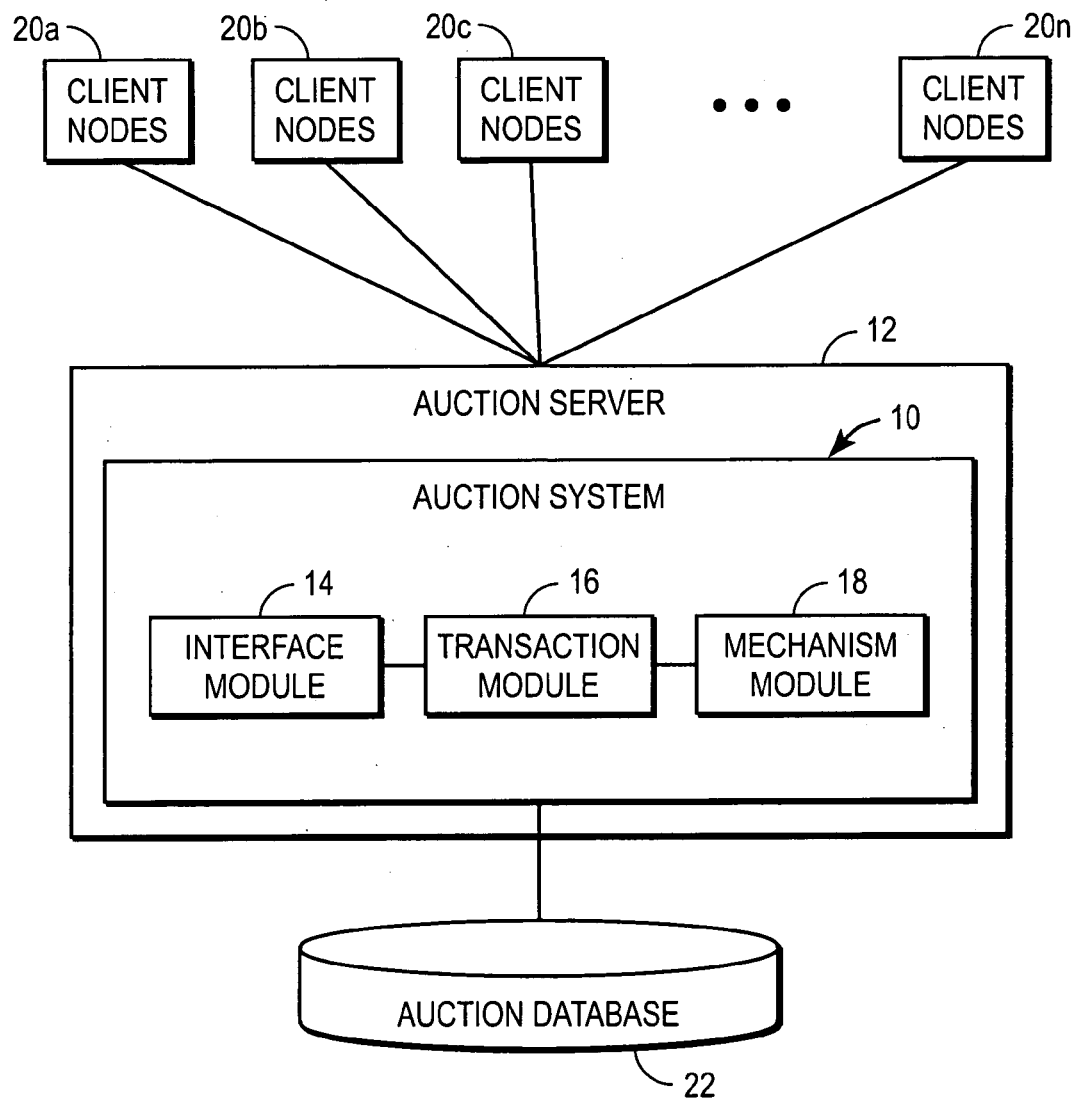
FIG. 1 is a functional block diagram depicting an illustrative auction system in accordance with the present invention.
Figure 2:
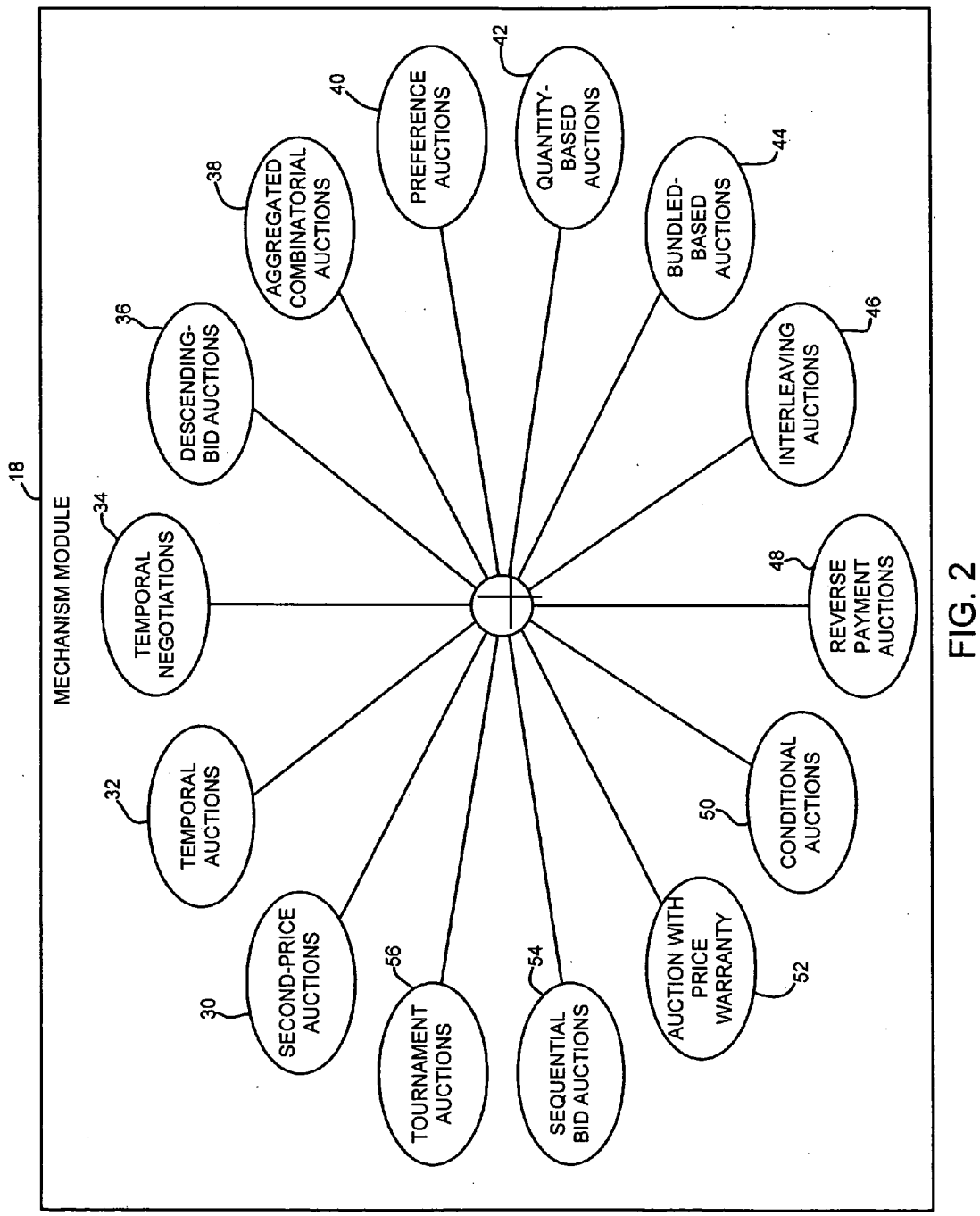
FIG. 2 is a functional block diagram depicting an illustrative mechanism module in accordance with the present invention.
Figure 3:
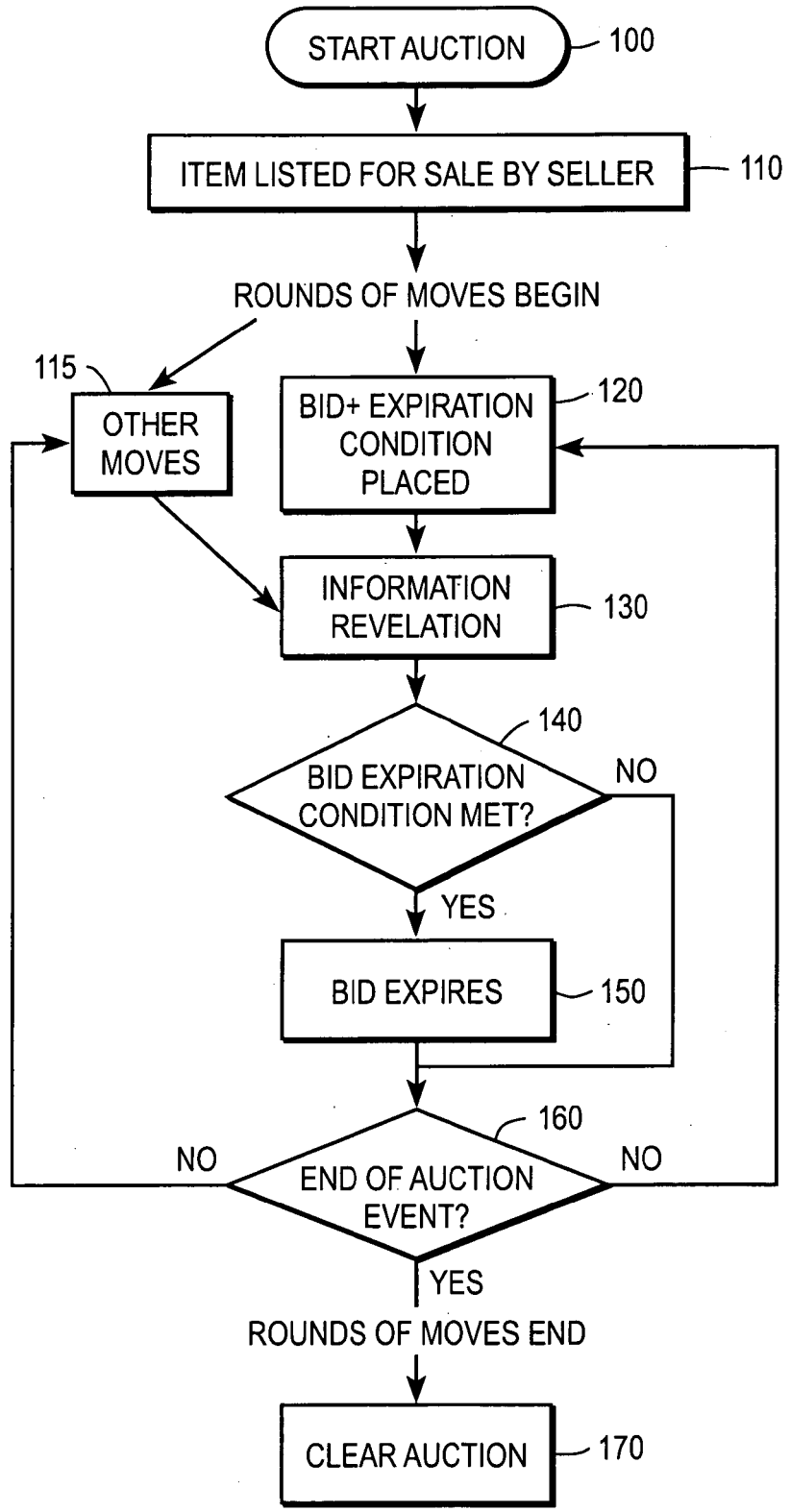
FIG. 3 is a logical flow diagram depicting the operations of a temporal auction process in accordance with the present invention.
Figure 4:
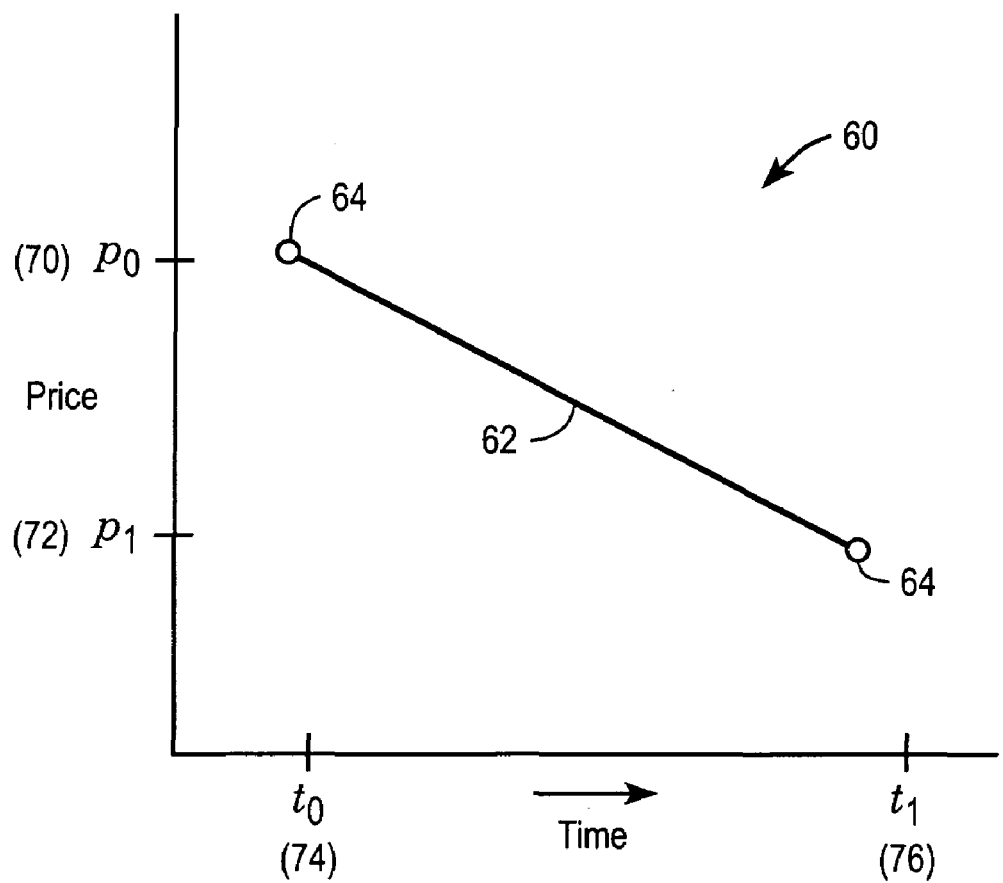
FIG. 4 is a graph depicting an illustrative relationship scheme between price and time in descending bid auctions in accordance with the present invention.
Figure 5:
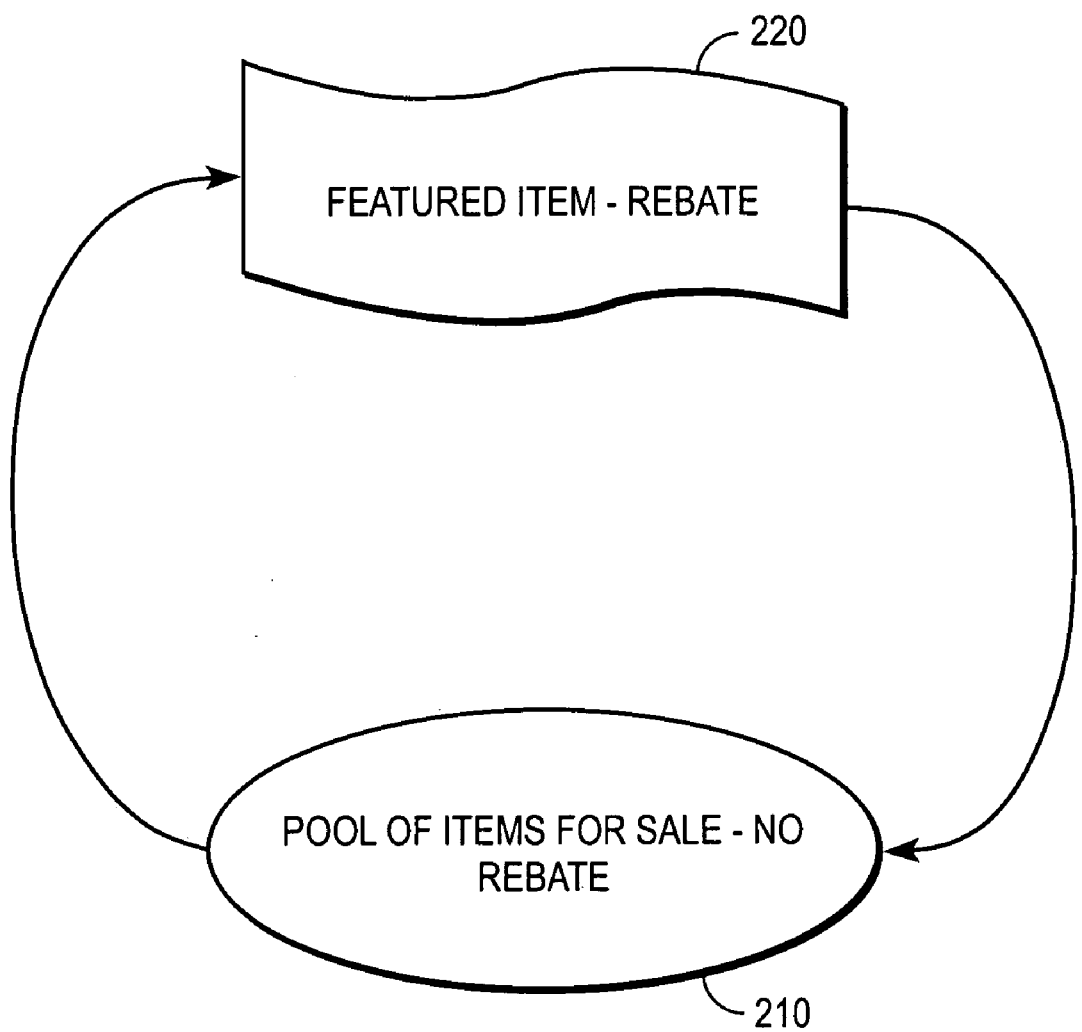
FIG. 5 is a functional block diagram depicting the states of items for auction/sale according to interleaving auctions in accordance with the present invention.
Figure 6:
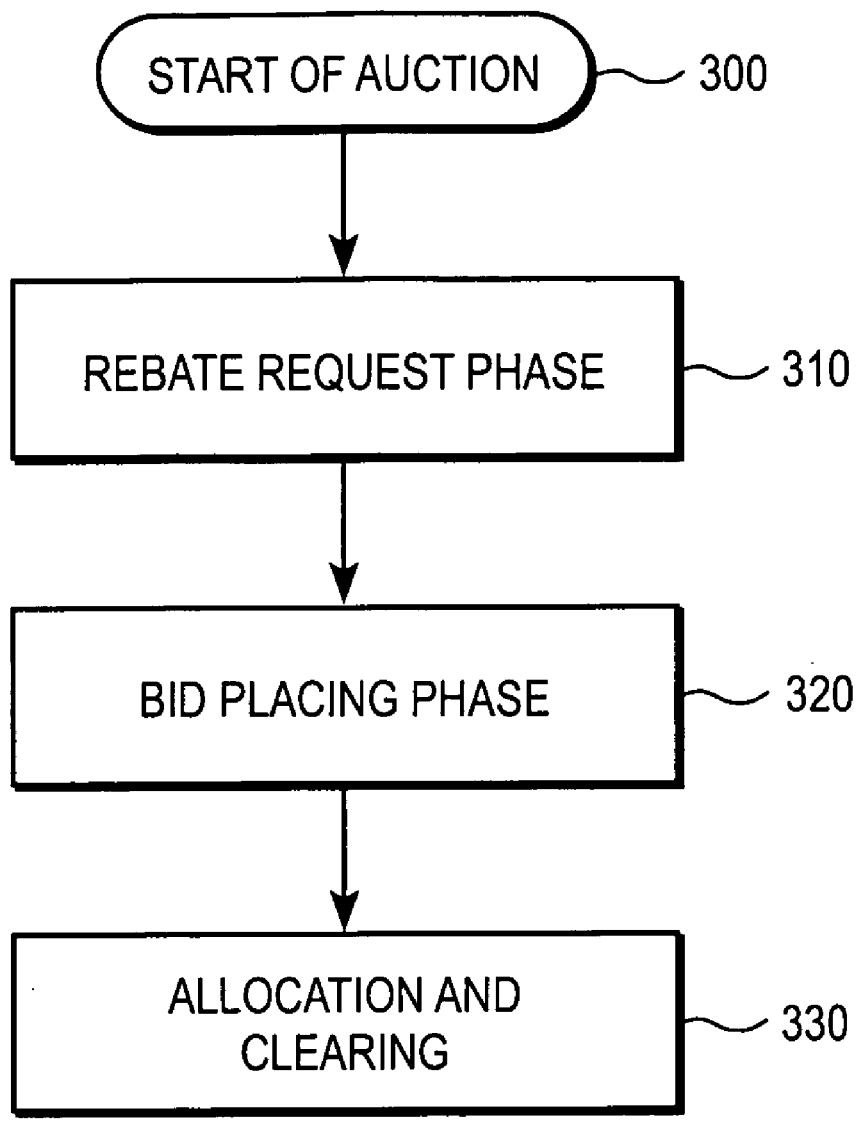
FIG. 6 is a logical flow diagram depicting the processes of a sequential bidding auction scheme in accordance with the present invention.

Referring more specifically to the drawings, for illustrative purposes the present invention is embodied in the apparatus shown in FIGS. 1, 2, 4 and 5 and the method outlined in FIGS. 3 and 6. It will be appreciated that the apparatus may vary as to configuration and as to details of the parts, and that the method may vary as to details and the order of the steps, without departing from the basic concepts as disclosed herein. The invention is disclosed generally in terms of online auction systems, although numerous other uses for the invention will suggest themselves to persons of ordinary skill in the art.

Referring first to FIG. 1, there is shown a functional block diagram of an illustrative auction system 10 in accordance with the present invention. The auction system 10 operates within a network server 12 which can be any standard data processing means or computer, including a minicomputer, a microcomputer, a UNIX® machine, a mainframe machine, a personal computer (PC) such as an INTEL® based processing computer or clone thereof, an APPLE® computer or clone thereof, or a SUN® workstation, or other appropriate computer.

Server 12 generally includes conventional computer components (not shown), such as a motherboard, a central processing unit (CPU), random access memory (RAM), hard drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. The server 12 has loaded in its RAM a conventional server operating system (not shown) such as UNIX®, WINDOWS® NT, NOVELL®, SOLARIS®, LINUX or other server operating system. Server 12 also has loaded in its RAM web server software (not shown) such as APACHE®, NETSCAPE®, INTERNET INFORMATION SERVER™ (IIS), or other appropriate web server software loaded for handling HTTP (hypertext transfer protocol) or Web page requests.

In accordance with the invention, auction system 10 comprises an interface module 14 operatively coupled for communication with a transaction module 16, and a mechanism module 18 operatively coupled for communication with the transaction module 16, each of which are discussed in more detail below. The auction system 10 is normally embodied in software executed by the server 12 and carrying out the operations described further below, although the auction system 10 may alternatively be embodied in circuitry which carries out the operations described herein by the auction system 10.

Server 12 is operatively coupled for communication to at least one client node 20a, although typically Server 12 will be coupled to a plurality of nodes (20a through 20n), each operatively coupled for communication with the auction system, 10, as shown in FIG. 1. Each client node 20a through 20n, like server 12, preferably comprises a standard computer such as a minicomputer, a microcomputer, a UNIX® machine, mainframe machine, personal computer (PC) such as an INTEL®, APPLE®, or SUN® based processing computer or clone thereof, or other appropriate computer. Each client node 20a through 20n also includes typical computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a model, network interface card (NIC), and/or other conventional input/output devices. Each client node 20a through 20n also has loaded in its RAM an operating system (not shown) such as UNIX®, WINDOWS® 98 or the like. Each client note 20a through 20n further has loaded in RAM a Web Browser program (not shown) such as NETSCAPE®, INTERNET EXPLORER®, AOL®, or like browsing software for client computers.

Each client node 20a through 20n is normally embodied in a conventional desktop or "tower" machine, but can alternatively be embodied in a portable or "laptop" computer, a handheld personal digital assistant (PDA), a cellular phone capable of browsing Web pages, a dumb terminal capable of browsing Web pages, an internet terminal capable of browsing Web pages such as WEBTV®, or other Web browsing devices.

Each client node 20a through 20n is networked for communication with server 12. Typically, a client node is operatively coupled to communicate with server 12 via the Internet through a phone connection using a modem and telephone line (not shown), in a standard fashion. A client node may alternatively be coupled to server 12 via a network (e.g., LAN, WAN, etc.) connection. It will be apparent to those skilled in the art having the benefit of this disclosure that alternative means for networking clients 20a through 20n and server 12 may also be utilized, such as a direct point to point connection using modems, satellite connection, direct port to port connection utilizing infrared, serial, parallel, USB, FireWire/IEEE-1394, and other means known in the art. Generally, client nodes 20a through 20n and server 12 communicate using the TCP/IP (transfer control protocol/internet protocol). However, other protocols for communication may also be utilized, including PPTP, NetBEUI over TCP/IP, voice-based protocols, and other appropriate network protocols.

While depicted as a single computer for purposes of disclosing an exemplary embodiment of the present invention, server 12 may comprise a plurality of servers (i.e., a server farm) to provide robust services to the client nodes 20a through 20n, as is known in the art.

As described above, the auction system 10 comprises an interface module 14, a transaction module 16 operatively coupled for communication with the interface module 14, and a mechanism module 18 operatively coupled for communication with the transaction module 16. The auction system 10 is further coupled to a data storage facility or database (DB) 22 wherein data associated with operation of the auction system 10 is maintained. The DB 22 maintains such information as the participants (buyers and sellers), the items for sale, the transactions, among other relevant auction data. Typically such information is maintained by the DB 22 using a conventional relational table scheme although other arrangements, such as a b-tree for example, may also be used for the storage and retrieval of data between the auction system 10 and the DB 22.

The interface module 14 is operatively coupled for communication with the client nodes 20a through 20n, normally via a network connection, such as an Internet connection. The interface module 14 carries out the operation of managing communications between the client nodes 20a through 20n and the auction system 10. For example, the auction system 10 may be configured as a "web" or "http" application, in which case the interface module 14 manages http requests from users of the client nodes 20a through 20n. Accordingly, the interface module 14 provides an interface (e.g., command line user interface, graphical user interface, or voice activated user interface) for auction participants (sellers and bidders) to engage in online auctions via requests submitted from the client nodes 20a through 20n to the auction system 10. A request issued by a participant is communicated to the transaction module 16 for further processing. The results (outcome) of the transaction are communicated as a reply to the user via interface module 14.

The transaction module 16 processes requests from participants of the auction system 10, which are communicated to the transaction module 16 via the interface module 14. For example, when a seller lists an item for sale with the auction system 10, the transaction module 16 manages the bids, messages, or other moves which are carried out by the participants as part of the auction process. The transaction module 16 also manages such auction events as the selection of bidders, the beginning and ending of rounds of moves, the information revelation and the clearing of the auctions, for example. As described further below, the mechanism module 18 defines the rules used by the transaction module 16 for carrying out its transactions.

The transaction module 16 is coupled with the DB 22 for storage and retrieval of auction related data. For example, the DB 22 maintains seller data, buyer or bidder data, auction item data, transaction (bids, messages, games, etc.) data, and other auction relevant data. The structure of DB 22 may comprise any suitable format for data storage and retrieval such as a relational table, for example.

The transaction module 16 is operatively coupled for communication to the mechanism module 18. The mechanism module 18 defines one or more auction rules which dictate the operation of transactions as carried out by the transaction module 16. The present invention provides a mechanism module with one or more enhanced auction modules, each defining rules of auction operation. In general, the enhanced auction modules extend, augment or otherwise enhance various auction elements including, for example, the selection of participants, the grouping of participants, the moves made by participants, the bidding process of the participants, the information revelation process, the auction closing process, and the auction clearing process, among others. In addition, the enhanced auction modules may be used separately or together during the auction process to further enhance the auction environment.

Referring now to FIG. 2, as well as FIG. 1, there is shown a functional block of an illustrative mechanism module 18 in accordance with the present invention. The mechanism module 18 comprises a plurality of enhanced auction modules 30 through 56, each available for auction use separately or together with one or more of the other modules 30 through 56. Each of the auction modules 30 through 56 defines a specific set of rules which dictate the auction operation process.

Auction module 30 provides for "second-price" auctions. According to auction module 30, during the bidding process for an item for sale, only the second-highest standing bid is revealed to the seller at each point in time, while the first-highest bid is kept secret by the auction system 10. At the close of auction for the item, the item is given to the bidder with the highest standing bid, and payment is made in the amount of the second-highest bid. If several ("k") units of the item are auctioned together, then the "k" highest bidders receive the "k" items, but they only pay the amount of the "k+1"-th highest bid. More generally, the second-price module implements the generalized version of the second-price scheme known as the Vickrey-Clarke-Grove scheme. In "reverse" auctions, sellers may place "sale" offers (i.e., offers to sell an item for a given price). In this case, only the second-lowest price is revealed to the buyer. At the close of auction, the seller with the lowest standing offer is awarded the sale, however the buyer pays the second-lowest price for the item. This "second-price" arrangement promotes truthful bidding (i.e., bidding the full monetary value of the item) and generally increases the economic efficienty of the transaction.

Auction module 32 provides for "temporal" auctions. According to module 32, each bid for an item not only specifies a monetary amount, but also an expiration event. That is the bid is valid (i.e., commits the bidder) until the expiration event occurs. Additionally, the seller may stop the auction at any time, at which point the item is sold to the bidder with the highest standing bid. The expiration event may be conditioned on various events, generally which are outside the control of the bidder. For example, the expiration event may be a specified date and time. In another example where several temporal auctions are run in parallel, the expiration of a bid in one auction can be made contingent on the outcome in another auction. Once the expiration event occurs, the bid expires and is no longer "standing". That is, the bidder is not further committed to purchase the item once the bid has expired. This arrangement provides the advantage that a bidder may bid on many similar items (in parallel), but also ensures that the bidder is only committed to one of the items. Another advantage with temporal auctions is that the expiration events may be hidden from the seller, thereby encouraging the seller to close the deal to prevent standing bids from expiring.

FIG. 3 depicts a logical flow diagram depicting the operations of an illustrative temporal auction process in accordance with the present invention. The auction process starts (box 100) when an item is listed for sale by a seller (box 110). After the item is listed for auction, the "rounds of moves" begin (box 115 through diamond 160).

During the "rounds of moves" phase of an auction the participants may engage in various legal "moves" as defined by the mechanism module (module 32, in this example). FIG. 3 illustrates such conventional moves as "other moves" (box 115). Box 130 is carried out after box 115.

At box 120, in addition to conventional auction moves (e.g., message exchange) as noted above for box 115, bidders may place bids with expiration conditions. Such conditions may be that the bid expires at a certain date or time. The bidder may also indicate that the bid is contingent on the outcome of another auction. Other such conditions may be placed by the buyer. Box 130 is then carried out.

At box 130, the auction information may be revealed to the participants of the auction. Such information may include such data as, the highest standing bid, the highest standing bidder, for example. Diamond 140 is then carried out.

At box 130, the auction information may be revealed to the participants of the auction. Such information may include such data as, the highest standing bid, the highest standing bidder, for example. Diamond 140 is then carried out.

At box 150, the expiration condition has occurred for a standing bid. Accordingly, the bid is now cancelled and no longer commits the bidder to the transaction. Diamond 160 is then carried out.

At diamond 160, the transaction module 16 determines whether an end of auction event has occurred for the current item for sale. For example, the item may have a specified time limit which has expired. Another example of an end of auction event is when the seller "closes the deal" and ends the auction. When an end of auction event occurs, the rounds of moves phase completes and box 170 is then carried out to clear the auction. Otherwise, moves continue with either box 115 or box 120. It is noted that this process described herein and depicted in FIG. 3 is only exemplary and other embodiments of the module 32 may be used in accordance with the invention.

Referring again to FIG. 2, as well as FIG. 1, auction module 34 provides for "temporal" negotiations. In temporal negotiations, bidders and sellers submit "bid" and "sell" temporal offers respectively. Each temporal offer can be made conditioned on some expiration event, as descried above for temporal auctions (module 32). Here, the seller may "close the deal" at any given time, at which point the item us sold to the bidder with the highest standing bid. Additionally, the bidder may "close the deal" at any given time, at which point the item is bought from the seller with the lowest standing offer. This procedure may lead to significant efficiency gains, especially in its second-price embodiment (i.e., when coupled with the second-price mechanism 30). In fact, it combines the flexibility of temporal offers (which allow, for instance, offers to be made for many substitute goods in parallel) with the efficiency of the second-price scheme (which creates incentives for truth-revelation on both sides).

Auction module 26 provides for "descending bid" auctions. In descending bid auctions, the sale price for an item decreases with time at a predetermined rate, normally determined by the seller. FIG. 4 depicts a graphical representation 60 of the relationship between the bid price and time. The slope 62 represents the auction price set to an initial value at point 64, which corresponds to price p0 (70) at time t0 (74). The slope 62 terminates at point 64, which corresponds to price p1 (72) and time t1 (76). As the auction opens, the price for the item begins at p0 (70) and over time declines to p1 (72). The p1 (72) price generally corresponds to the seller's "reserve" price. It will be appreciated that slope 62 is only exemplary, and that various other (non-linear) slopes may also be used.

A bidder may place bids at any time (between t0 (74) and t1(76)) at the current price, at which point the item is sold at the current price. For multiple items, the price may continue to decline until all items are sold or the reserve price is reached. It is noted that the seller may place a reserve price which is the lowest amount the seller is willing to sell the item. In such a case, p1 (72) will be greater than zero (0).

In a case where this module 36 is combined with the second-price auction module 30, the first bidder wins the auction when a second bidder places a second (lower) bid; in this case, the bidder pays the sale price at which the second bidder bids.

Referring again to FIG. 2, as well as FIG. 1, auction module 38 provides for aggregated combinatorial auctions. In general, the module 38 provides a process wherein different auctions, by different sellers, are aggregated in order to yield a unified combinatorial auction. According to this module 38, sellers register their goods until a specified date (Date 1). These goods are sold together (aggregated) in one big auction which ends on a second specified date (Date 2). From date 1 to date 2, bidders submit bids for any of the goods, while specifying when certain goods are "substitute" and they only wish to obtain a predetermined amount (e.g., one item). On date 2, the auction closes and the market is cleared. This scheme provides the advantage of allowing for bids on combinations of items, even though the items may be put on sale by different sellers. In turn, the combinatorial bids provide better deals for buyers who have an interest in acquiring several items in conjunction.

Auction module 40 provides for "preference" auctions. According to preference auctions (module 40), preference auctions generally involve "sealed" (hidden) bids for substitute goods. In particular, a bidder, when placing a bid for an item, specifies the bid price and the preference (priority) value for the item. Subsequently, when the bidder places additional bids for "substitute" items, the bidder may specify the price and preference value for such additional items, thereby creating a ranking hierarchy for each bid placed.

At the close of the auction, auction module 40 further provides an allocation algorithm to close the auction items according to bid price and ranking. Namely for each item, the highest bidder wins. However, a bidder may potentially be the highest bidder in two or more substitute items. In this case, the allocation algorithm provides that the bidder only wins the highest rank item. The bids for the lower ranked items are cancelled. Under this arrangement, the auction module 40 provides for a substantially more efficient and profitable auction environment over the prior art auction model. After allocation of the items is completed, the auction is cleared.

Auction module 42 provides for enhanced "quality-based" auctions. According to module 42, the purchase prices are determined by the total quantity of items sold. More particularly, the price for an item is determined not only by the total sales of that item, but also by the total sales of other related goods. That is, price for items in the auction can be made functional on the total quantity sold. For example, once the total number of sales for video cassette recorders (VCR) has reached a certain threshold, the price for televisions (TV) drops by a predetermined amount. As more VCRs are purchased, the price for TVs accordingly decreases. In this way, the sale price is inversely proportional to the number of bids received for said goods. According to one implementation, the seller may provide a table of prices, wherein the price for each item is specified according to the number of bids received. During the auction, the sale price for each item for auction is set according to the number of bids received. Additionally, bidders may use "proxy" (conditional) bids which commit the bidder only if a certain condition occurs, such as, if the price of a bundle drops below a certain threshold.

Auction module 44 provides for enhanced "bundle-based" auctions. According to module 44, a "bundle" is sold when the total revenue for the bundle reaches some predetermined reserve price, which may be hidden or revealed. Under this scheme, a seller may list two or more items (i.e., a "bundle") and indicate a reserve price for the entire bundle. That is, the seller provides a "shared" reverse price, so that when the bids for the individual items are added together, if the sum satisfies the "shared" reserve price, the bundle is then sold. In general, if the "shared" reserve price is not met, none of the items in the bundle are sold.

Although not required, the seller may further elect to provide individual reserve prices for each item in the bundle individually. In this case, a seller is able to sell those individual items which satisfy for the item's reserve price, even though the entire bundle does not satisfy the "shared" reserve price. The auction scheme provided by module 44 provides an advantageous means for a seller to liquidate a plurality of items.

Auction module 46 provides for "interleaving" auctions. In interleaving auctions, an item for sale is periodically "featured" for a predetermined interval of time. After the interval, the item returns to a "normal" or non-featured state. Should a bidder place a bid for an item while it is "featured" a discount is associated with the bid. In the preferred embodiment, the bidder is also required to show awareness of the fact that the item is currently featured in order to get the discount. For example, the bidder may be required to provide a "feature number" associated with the item. Subsequently, should the bidder win the auction (normally by placing the highest bid), the bidder receives the discount An item may be featured according to a random event by a random number generator which selects an item, or an item may be periodically cycled as a "featured" item according to a predetermined interval. Interleaving auctions, in general, encourage potential buyers to monitor the site to determine when an item they are interested becomes "featured" to thereby obtain a discounted sale price. Accordingly, an auction site providing the features of interleaving auctions may generate more traffic (and thus revenue) over those auction sites without interleaving auctions.

FIG. 5 illustrates the cycling process 200 of auction items according to auction module 46. Items for sale are generally either in the "normal" state 210, where no rebate is generally provided for bids received during this state. At periodic intervals, the items in this pool may be featured (state 220), where a rebate is provided for bids received during this state. It is noted that items may be featured in parallel and/or sequentially with other items in the pool.

It is further noted that the present "featured item" scheme differs from conventional "featured item" schemes which simply highlight an item to draw attention to bidders without providing a discount or which periodically cycles from "normal" to "feature" mode.

Auction module 48 provides for "reverse payment" auctions. According to module 48, an auction is presented for a plurality of identical items. If there are "k" number of items, there will be "k" number of winning bidders. Additionally, the highest bidder receives a rebate (or discount) to the sale price of the item. In the preferred embodiment, the rebate amount is such that the highest bidder will ultimately pay less than the lowest bidder. Since the highest bidder pays less than the other winners, this mechanism stimulates competition among bidders to be the highest bidder. Other rebate amounts may also be used to encourage bidding competition.

Module 48 is suitable for use with conventional auctions where the highest bid amount is disclosed. Alternatively, module 48 may also be configured to disclose only the second highest bid amount, thereby making competition for the highest bid more challenging.

Auction module 50 provides for "conditional" auctions. In conditional auctions, an external event may be tied to auction sales, such that the occurrence of an external event outside the control of the participant may be used to influence the auction terms (e.g., allocation and payment). For example, the sale price for an item may be conditioned on stock market prices, or city temperature, for example. Alternatively, the final allocation of the item may be subject to the occurrence of an external event. For example, a predetermined, publicly disclosed condition may be attached to the item for sale; at the close of the auction, the highest bidder receives the auctioned item if, and only if, the external condition is verified.

Auction module 52 provides for "auctions with price-warranty". According to module 52, a seller may list an item for sale with a "price-warranty". In this case, the seller warrants that if an identical item is sold (auctioned) subsequent to the present auction for the item at a price lower than the sale price for the present auction, the buyer will receive a rebate. The rebate amount is normally the difference in value between the original sale and the subsequent sale. Normally, the subsequent sale must fall within a specified time (e.g., thirty days) of the original auction to qualify for the rebate.

Auction module 54 provides for "sequential bid" auctions. According to module 54, the bidding process follows a two-phase process as depicted in FIG. 6. Process 300 initiates the auction process for the item, when the item is listed for sale by the seller. Box 310 follows process 300.

At box 310 (the rebate request phase), bidders submit or request a rebate amount (to the sale price) for the item for sale. According to the scheme of module 54, the rebate amount requested by each bidder determines the order of in which bids are received during the second phase (box 320) which is then carried out.

At box 320 (the bidding placing phase), participants submit bids in the order given by their requested rebate such that participant who requested higher rebates bid before participants who requested lower rebates. In general, participants who bid after other participants are aware of the previous participant bids. Box 330 is then carried to provide allocation of the sale and clearing of the auction using conventional allocation and clearing means.

This auction scheme enables participants to explore the spectrum between obtaining information about other bids and obtaining a user-defined rebate amount on the participants bid, should the participant win.

Auction module 56 provides for "tournament" (or "survival") auctions. According to auction module 56, a plurality of items (i.e., "n" items) are sequentially auctioned in "n" consecutive rounds of bidding. At the end of each round of bidding only a pre-specified number of the highest bidders is allowed to proceed to the next round, while the remaining bidders are excluded from participation in the remaining rounds. For example, module 56 may provide that only a certain number of bidders "survive" to the next rounds of bidding. Alternatively, module 56 may provide that a certain number of current bidders are excluded (i.e., do not "survive") from participation in the next rounds. Other arrangements for limiting the number of bidding participants for successive rounds may also be used with this module scheme.

Additionally, the highest bidder at the end of each round receives the item offered for sale at that round. In one embodiment of auction module 56, all bidders pay the amount of their bids at each round regardless of whether they receive the item or not. This arrangement allows a bidder to compete strategically for a sequence of similar or dissimilar items, and provides for a more entertaining and challenging online transaction environment.

While modules 30 through 56 of the mechanism module 18 may be used separately to drive the transaction module 16 in carrying out its transactions, the modules 30 through 56 may be combined with one or more of the other modules to provide further combinations and extensions to the auction environment to the participants.

Accordingly, it will be seen that this invention provides an online auction system which provides a plurality of extensions to various auction elements. The present auction system provides additional participant entertainment, efficiency, and profitability not present in conventional systems. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. An online auction system having at least one seller member (seller) and at least one buyer member (bidder), said auction system comprising:
    a computer device configured to communicate with said at least one seller member and said at least one buyer member, the computer device comprising:
    an interface module configured to provide a user interface between the seller and the bidder;
    a transaction module operatively coupled for communication to said interface module configured to manage transactions associated with moves made by the seller and the bidder in conjunction with a sale of an item by the seller; and
    a mechanism module operatively coupled for communication to said transaction module said mechanism module defining at least one auction rule, said transaction module further configured to carry out transactions according to said auction rule defined by said mechanism module, said mechanism module comprising rule defining programming associated with temporal auction transactions and second-price auction transactions, wherein said rule defining programming is configured to:
        receive a bid from a bidder for an item for sale;
        receive in conjunction with said bid an expiration condition for said bid; and
        cancel said bid when said expiration condition is met;
        allow the seller to close the auction at any time;
        during the course of the auction, reveal to all bidders only the second-highest standing bid for an item for sale;
        maintain the first-highest standing bid in confidence for the item of sale; and
        allocate the sale price of the item for sale in the amount of the second-highest bid at the close of sale.

2. An online auction system having at least one seller member (seller) and at least one buyer member (bidder), said auction system comprising:
    a computer device configured to communicate with said at least one seller member and said at least one buyer member, the computer device comprising:
    an interface module configured to provide a user interface between the seller and the bidder;
    a transaction module operatively coupled for communication to said interface module configured to manage transactions associated with moves made by the seller and the bidder in conjunction with a sale of an item by the seller; and
    a mechanism module operatively coupled for communication to said transaction module, said mechanism module defining at least one auction rule, said transaction module further configured to carry out transactions according to said auction rule defined by said mechanism module, said mechanism module comprising rule defining programming associated with temporal negotiation transactions and second-price auction transactions, wherein said rule defining programming is configured to:
        receive a bid offer from a bidder for an item for sale;
        receive in conjunction with said bid offer a bid expiration condition for said bid offer; and
        cancel said bid offer when said bid expiration condition is met;
        receive a sale offer from a seller for an item for sale;
        receive in conjunction with said sale offer a sale expiration condition for said sale offer;
        cancel said sale offer when said sale expiration condition is met;
        during the course of the auction, reveal to all bidders only the second-highest standing bid for an item for sale;
        maintain the first-highest standing bid in confidence for the item of sale; and
        allocate the sale price of the item for sale in the amount of the second-highest bid at the close of sale.

3. An online auction system having at least one seller member (seller) and at least one buyer member (bidder), said auction system comprising:
    a computer device configured to communicate with said at least one seller member and said at least one buyer member, the computer device comprising:
    an interface module configured to provide a user interface between the seller and the bidder;
    a transaction module operatively coupled for communication to said interface module configured to manage transactions associated with moves made by the seller and the bidder in conjunction with a sale of an item by the seller; and
    a mechanism module operatively coupled for communication to said transaction module, said mechanism module defining at least one auction rule, said transaction module further configured to carry out transactions according to said auction rule defined by said mechanism module, said mechanism module comprising rule defining programming associated with descending bid auction transactions, wherein said rule defining programming is configured to:
        receive a starting sale price for at least one item for sale from a seller;
        decrease said sale price for the item at a predetermined interval during the sale of the item;
        during the course of the auction, reveal to all bidders only the second-highest standing bid for an item for sale;
        maintain the first-highest standing bid in confidence for the item of sale;
        allocate the sale price of the item for sale in the amount of the second-highest bid at the close of sale;
        receive a reserve price for the item for sale, said reserve price lower than said starting sale price; and
        terminate the sale of the item when the sale price is equal to said reserve price.

* * * * *